UNITED STATES PATENT OFFICE.

WERNER VON BOLTON, OF CHARLOTTENBURG, GERMANY, ASSIGNOR TO SIEMENS & HALSKE, A. G., OF BERLIN GERMANY, A CORPORATION OF GERMANY.

METHOD OF MANUFACTURING FILAMENTS FOR ELECTRIC LAMPS.

No. 927,935.     Specification of Letters Patent.     Patented July 13, 1909.

Application filed October 22, 1907. Serial No. 398,675.

*To all whom it may concern:*

Be it known that I, WERNER VON BOLTON, a subject of the Czar of Russia, and residing at Am Lützow 10, Charlottenburg, near Berlin, Germany, have invented Improvements in Methods of Manufacturing Filaments for Electric Lamps, of which the following is a specification.

The present invention has for its object an improved method of manufacturing filaments of highly refractory metals for electric incandescent lamps.

In order to be able to bring metals, which in themselves alone can only be molded with difficulty, as, for example, tantalum, tungsten, molybdenum, into the form of filaments for electric incandescent lamps, in accordance with the present invention the concerned metal is embedded in a state of fine division in another metal, as, for example, thorium, gold, copper, aluminium, and particularly nickel, in such a manner that each of the finest particles of the concerned metal is inclosed by a casing of the other metal. This metallic mass which is thus obtained is then wrought into the form of filaments mechanically by rolling or drawing, or under certain circumstances by pressing, squirting or the like, whereupon in case of need the inclosing metal can be removed by mechanical or chemical means or by vaporization.

One metallic powder can be embedded in another ductile metal in the most different ways, as, for example, by the metallic powder being put into a molten mass of the other concerned metal and distributed uniformly in the latter, or by a powder of the one metal being intimately mixed with a powder of the other metal and afterward united by pressure. During the application of pressure to the mixed powder, the ductile metal yields and unites into small plates which cohere and form a covering or casing for the non-ductile metal. The union can also be effected in the latter case by the mixture of the metallic powders being subsequently heated in such a manner that the ductile metal, which is supposed to be less refractory, is converted into one cohesive mass by its parts being welded or sintered together, or by its parts being united in a melted state, which cohesive mass envelops the particles of the metallic powder of the highly refractory metal.

When it is desired to remove the enveloping metal, this can be done for example, if the enveloping metal is not employed in too great excess, by passing through it an electric current by which the filament is heated, so that the enveloping metal is volatilized. The metallic particles which remain behind then sinter together into one filament. If another metal is employed as the enveloping metal which itself possesses a very high melting point, this can remain in the finished filaments. Thorium metal, for example, is such an exceedingly easily ductile metal having a very high melting point and one which can be worked up mechanically in this manner.

What I claim as my invention and desire to secure by Letters Patent is:—

1. A method of manufacturing filaments of highly refractory metals for electric lamps consisting in surrounding each particle of the comminuted concerned metals with a casing of another ductile metal and forming a cohesive mass of the metals and in forming the mass into filaments.

2. A method of manufacturing filaments of highly refractory metals for electric lamps consisting in comminuting another ductile metal, in mixing the comminuted concerned metals intimately together and uniting the same into a cohesive mass in such a manner that each particle of the highly refractory metals is surrounded with a casing of the ductile metal, and in forming the mass into filaments.

3. A method of manufacturing filaments of highly refractory metals for electric lamps consisting in mixing the comminuted highly refractory metals and comminuted ductile metal intimately together and electrically heating the same into a cohesive mass in such a manner that each particle of the highly refractory metal is surrounded with a casing of the ductile metal, and in drawing the mass into filaments.

4. A method of manufacturing filaments of highly refractory metals for electric lamps consisting in mixing the comminuted highly refractory metals and comminuted thorium metal intimately together and uniting the same into a cohesive mass in such a manner that each particle of the highly refractory metals is surrounded with a casing of thorium, and in forming the mass into filaments.

In testimony whereof I have signed my name to this specification in the presence of two witnesses.

WERNER VON BOLTON.

Witnesses:
HENRY HASPER,
WOLDEMAR HAUPT.